(12) United States Patent
Brady et al.

(10) Patent No.: US 9,432,591 B2
(45) Date of Patent: Aug. 30, 2016

(54) MULTISCALE OPTICAL SYSTEM HAVING DYNAMIC CAMERA SETTINGS

(71) Applicant: Duke University, Durham, NC (US)

(72) Inventors: David Jones Brady, Durham, NC (US); Jungsang Kim, Chapel Hill, NC (US); Daniel Marks, Durham, NC (US); Hui Seong Son, Durham, NC (US)

(73) Assignee: Duke University, Durham, NC (US)

(*) Notice: Subject to any disclaimer, the term of this patent is extended or adjusted under 35 U.S.C. 154(b) by 503 days.

(21) Appl. No.: 13/889,007

(22) Filed: May 7, 2013

(65) Prior Publication Data

US 2013/0242060 A1 Sep. 19, 2013

Related U.S. Application Data

(63) Continuation-in-part of application No. 13/095,407, filed on Apr. 27, 2011, now Pat. No. 8,830,377, which is a continuation-in-part of application No. 12/651,894, filed on Jan. 4, 2010, now Pat. No. 8,259,212.

(51) Int. Cl.
H04N 5/262 (2006.01)
H04N 5/232 (2006.01)
H04N 5/225 (2006.01)
(Continued)

(52) U.S. Cl.
CPC ............ *H04N 5/2624* (2013.01); *G02B 13/06* (2013.01); *H04N 5/2254* (2013.01); *H04N 5/23212* (2013.01); *H04N 5/23238* (2013.01);
(Continued)

(58) Field of Classification Search
CPC ...... G02B 13/006; G02B 13/06; H04N 5/247; H04N 5/37213; H04N 5/2624; H04N 5/2254
USPC ......................................... 348/345, 218.1, 48
See application file for complete search history.

(56) References Cited

U.S. PATENT DOCUMENTS 3,669,527 A 6/1972 Fuller
4,184,749 A 1/1980 Grossman
(Continued)

FOREIGN PATENT DOCUMENTS

EP 0809124 A3 7/1998
EP 0893915 A2 1/1999
(Continued)

OTHER PUBLICATIONS

"Related Japanese Patent Application No. JP 2011-544647", "Office Action", Dec. 3, 2013, Publisher: JPO, Publisher in: JP.
(Continued)

*Primary Examiner* — Nelson D. Hernández Hernández
(74) *Attorney, Agent, or Firm* — Kaplan Breyer Schwarz & Ottesen, LLP

(57) ABSTRACT

A multiscale imaging system including microcameras having controllable focus, dynamic range, exposure, and magnification is disclosed. The objective lens forms a three-dimensional image field of a scene. Image regions of the image field are relayed by the microcameras onto their respective focal-plane arrays, which collectively provide a plurality of digital sub-images of the scene. The digital sub-images can then be used to form a composite digital image of the scene that can have enhanced depth-of-field, enhanced dynamic range, parallax views of the scene, or three-dimensionality.

30 Claims, 9 Drawing Sheets

(51) Int. Cl.
- *H04N 13/02* (2006.01)
- *G02B 13/06* (2006.01)
- *G02B 27/00* (2006.01)
- *G03B 37/04* (2006.01)

(52) U.S. Cl.
CPC ....... *H04N13/0203* (2013.01); *G02B 27/0025* (2013.01); *G03B 37/04* (2013.01)

(56) References Cited

U.S. PATENT DOCUMENTS

| | | |
|---|---|---|
| 4,323,925 A | 4/1982 | Abell et al. |
| 5,004,328 A | 4/1991 | Suzuki et al. |
| 5,012,081 A | 4/1991 | Jungwirth et al. |
| 5,161,062 A | 11/1992 | Shafer et al. |
| 5,311,611 A | 5/1994 | Mlgliaccio |
| 6,097,551 A | 8/2000 | Kreitzer |
| 6,137,535 A | 10/2000 | Meyers |
| 6,320,703 B1 | 11/2001 | Chen et al. |
| 6,339,506 B1 | 1/2002 | Wakelin et al. |
| 6,556,349 B2 | 4/2003 | Cox et al. |
| 7,123,777 B2 | 10/2006 | Rondinelli et al. |
| 7,499,094 B2 | 3/2009 | Kuriyama |
| 7,728,901 B2 | 6/2010 | Onozawa et al. |
| 8,049,806 B2 | 11/2011 | Feldman et al. |
| 8,259,212 B2 | 9/2012 | Brady et al. |
| 2003/0106208 A1 | 6/2003 | Hosier et al. |
| 2003/0231255 A1 | 12/2003 | Szajewski et al. |
| 2004/0061787 A1 | 4/2004 | Liu et al. |
| 2004/0212882 A1 | 10/2004 | Liang et al. |
| 2004/0223071 A1 | 11/2004 | Wells et al. |
| 2004/0257460 A1 | 12/2004 | Kuriyama |
| 2005/0052751 A1 | 3/2005 | Liu et al. |
| 2005/0109918 A1 | 5/2005 | Nikzad et al. |
| 2005/0174643 A1 | 8/2005 | Lee et al. |
| 2006/0054782 A1* | 3/2006 | Olsen et al. ............... 250/208.1 |
| 2006/0055811 A1 | 3/2006 | Fritz et al. |
| 2006/0209292 A1 | 9/2006 | Dowski, Jr. et al. |
| 2007/0109438 A1 | 5/2007 | Duparre et al. |
| 2007/0200946 A1 | 8/2007 | Onozawa et al. |
| 2007/0252074 A1 | 11/2007 | Ng et al. |
| 2008/0080066 A1 | 4/2008 | Saito |
| 2008/0123205 A1 | 5/2008 | Nakano et al. |
| 2009/0140131 A1 | 6/2009 | Utagawa |
| 2009/0303595 A1* | 12/2009 | Lim et al. ..................... 359/557 |
| 2010/0103300 A1 | 4/2010 | Jones et al. |
| 2010/0171866 A1 | 7/2010 | Brady et al. |
| 2010/0264502 A1 | 10/2010 | Christophersen et al. |
| 2011/0211106 A1 | 9/2011 | Marks et al. |
| 2011/0268868 A1 | 11/2011 | Dowski, Jr. et al. |
| 2013/0076900 A1 | 3/2013 | Mrozek et al. |
| 2013/0242060 A1 | 9/2013 | Brady et al. |
| 2014/0139623 A1 | 5/2014 | McCain et al. |
| 2014/0176710 A1 | 6/2014 | Brady et al. |
| 2014/0192254 A1 | 7/2014 | Marks et al. |
| 2014/0320708 A1 | 10/2014 | Marks et al. |

FOREIGN PATENT DOCUMENTS

| | | |
|---|---|---|
| JP | S-6381413 A | 4/1988 |
| JP | H04196689 A | 7/1992 |
| JP | H-05226218 A | 9/1993 |
| JP | 035999 A | 2/1995 |
| JP | H-09509265 A | 9/1997 |
| JP | 2001-005054 A | 1/2001 |
| JP | 2003-283932 A | 10/2003 |
| JP | 2001-151718 A | 5/2004 |
| JP | 2004526300 A | 8/2004 |
| JP | 2005045141 | 2/2005 |
| JP | 2005136325 A | 5/2005 |
| JP | 2007-004471 A | 1/2007 |
| WO | 9523349 A1 | 8/1995 |
| WO | 9926419 A1 | 5/1999 |

OTHER PUBLICATIONS

Abdelaaziz Tissire, "Related U.S. Appl. No. 13/095,407", "Non-Final Office Action", Feb. 19, 2014, Publisher: USPTO, Published in: US.

Lam, Edmund Y., "Compact and Thin Multi-lens System for Machine Vision Applications", "Image Processing: Machine Vision Applications", 2008, vol. 6813, Publisher: SPIE-IS&T Electronic Imaging.

Christensen et al., "Multiscale Optical Design for Global Chip-to-Chip Optical Interconnections and Misalignment Tolerant Packaging", "IEEE Journal on Selected Topics in Quantum Electronics", Mar./Apr. 2003, vol. 9, No. 2, Publisher: IEEE.

Duparre et al., "Thin compound-eye camera", "Applied Optics XP-002578598", 2005, vol. 44, No. 15, Publisher: Optical Society of America, Published in: US.

Hiroshima, "Related Japanese Patent Application No. JP2011-544647 Office Action", Dec. 11, 2012, Publisher: JPO, Published in: JP.

Hylla, Winfried, "PCT Application No. PCT/US2010/020077 International Preliminary Report on Patentability Mar. 31, 2011"Publisher: PCT.

Hylla, Winfried, "PCT Application No. PCT/US2010/020077 International Search Report May 4, 2010", , Publisher: PCT, Published in: PCT.

J. S. Chahl and M. V. Srinivasan, "Reflective surfaces for panoramic imaging", "Applied Optics", Nov. 1, 1997 pp. 8275-8285, vol. 36, No. 31, Publisher: Optical Society of America, Published in: AU.

Quertemont, Eric, "PCT Application No. PCT/US2011/034156 International Search Report Sep. 23, 2011"Publisher: PCT, Published in: PCT.

Tissire, Abdelaaziz, "Related U.S. Appl. No. 13/095,407 Office Action", Mar. 15, 2013, Publisher: USPTO, Published in: US.

Daniel L. Marks, "Close-up Imaging Using Microcamera Arrays for Focal Plan Synthesis", "2011 SPIE", Mar. 2011, pp. 1-9, vol. 50, No. 3, Publisher: Optical Engineering.

David J. Brady et al, "Multiscale lens design", Jun. 10, 2009, pp. 10659-10674, vol. 17, No. 13, Publisher: Optics Express.

David J. Brady, "Focus in Multiscale Imaging Systems", "Imaging and Applied Optics Technical Digest", 2012, Publisher: Duke Imaging and Spectroscopy Program, ECE Department, Published in: US.

Brady, et al., "Gigapixel Photography Supplementary Information", "nature11150", , pp. 1-30, Publisher: www.Nature.com/Nature, Published in: US.

Brady, et al., "Multiscale gigapixel photography", "nature11150", Jun. 21, 2012, pp. 386-389, vol. 486, Publisher: Macmillan Publishers Limited, Published in: US.

David J. Brady, "Multiscale Optical Systems", "Optical Society of America", 2009, Publisher: Duke University Fitzpatrick Institute for Photonics, Department of Electrical & Computer Engineering, Published in: US.

Brady, et al., "Petapixel Photography and the Limits of Camera Information Capacity", "Computational Imaging XI", 2013, vol. 8657, 86570B, Publisher: Department of Electrical and Computer Engineering, Duke University, Published in: US.

Golish, et al., "Challenges in gigapixel multiscale image formation", "Imaging and Applied Optics Technical Digest", 2012, Publisher: Department of Electrical and Computer Engineering, University of Arizona, Published in: US.

Golish, et al., "Image formation in multiscale optical systems", "Imaging and Applied Optics Technical Digest", 2011, Published in: US.

D.R. Golish et al, "Development of a scalable image formation pipeline for multiscale gigapixel photography", Sep. 24, 2012, pp. 22048-22062, vol. 20, No. 20, Publisher: Optics Express.

Hagen, et al., "Aberration correction in multiscale lenses", "OSA/FiO/LS/AO/AIOM/COSI/LM/SRS 2009", 2009, Publisher: Optical Society of America, Published in: US.

(56) References Cited

OTHER PUBLICATIONS

Kittle, et al., "Automated calibration and optical testing of the AWARE-2 gigapixel multiscale camera", "Digital Photography IX", 2013, vol. 8660, 866006, Publisher: Electrical and Computer Engineering, Duke University, Published in: US.

Daniel L. Marks et al, "Microcamera aperture scale in monocentric gigapixel cameras", Oct. 20, 2011, pp. 5824-5833, vol. 50, No. 30, Publisher: Applied Optics.

Daniel L. Marks et al, "Close-up imaging using microcamera arrays for focal plane synthesis", Mar. 23, 2011, pp. 1-9, vol. 50, No. 3, Publisher: Optical Imaging.

Daniel L. Marks, "Gigagon: a Monocentric Lens Design Imaging 40 Gigapixels", Publisher: Optical Society of America.

Daniel L. Marks et al, "Gigapixel Imaging with the Aware Multiscale Camera", p. 31 Publisher: Optics & Photonics News.

Daniel L. Marks, "A common scalable microcamera design for 2, 10, and 40 gigapixel class multiscale cameras", , Publisher: Technical Digest.

Daniel L. Marks et al, "Engineering a gigapixel monocentric multiscale camera", Aug. 7, 2012, pp. 1-13, vol. 51, No. 8, Publisher: Optical Engineering.

Daniel L. Marks, "Optical Testing of the Aware Wide Field 2-Gigapixel Multiscale Camera", Sep. 30, 2011, pp. 1-2, Publisher: Technical Digest.

Marks, et al., "Optimizing microcamera aperture in gigapixel monocentric multiscale cameras", "Imaging and Applied Optics Technical Digest", 2011, Published in: US.

Marks, et al., "Wide-Field Microscopy using Microcamera Arrays", "Three-Dimensional and Multidimensional Microscopy: Image Acquisition and Processing XX,", , vol. 8589 85890Z-1, Publisher: aDuke University, Department of Electrical and Computer Engineering, Published in: US.

Son, et al., "A Multiscale, Wide Field, Gigapixel Camera", "Imaging and Applied Optics Technical Digest", 2011, Published in: US.

Hui S. Son et al, "Design of a spherical focal surface using closepacked relay optics", Aug. 15, 2011, pp. 16132-16138, vol. 19, No. 17, Publisher: Optics Express.

Eric J. Tremblay et al, "Design and scaling of monocentric multiscale imagers", "Applied Optics", Jul. 10, 2012, pp. 4691-4702, vol. 51, No. 20, Publisher: Optical Society of America.

Kelly J. Jerabek, "U.S. Appl. No. 12/651,894 Office Action", Mar. 14, 2012, Publisher: USPTO, Published in: US.

Hui S. Son et al, "Optomechanical design of multiscale gigapixel digital camera", "Applied Optics", Mar. 10, 2013, pp. 1541-1549, vol. 52, No. 8, Publisher: Optical Society of America.

"First Office Action", issued in related EP Patent Application No. 10 701 047.2, dated Aug. 3, 2015.

"Office Action", issued in counterpart Japanese patent application No. 2011-544647, issued on Sep. 3, 2014.

"NonFinal Offfice Action", issued in co-pending U.S. Appl. No. 13/740,021, dated Jun. 24, 2015.

"Office Action" issued in counterpart Japanese patent application No. 2013-508216, issued on Mar. 19, 2015.

"Final Office Action", issued in co-pending U.S. Appl. No. 14/313,233, issued on Jul. 1, 2015.

"Final Office Action" issued in related U.S. Appl. No. 13/740,021, dated Jan. 29, 2016.

"Notice of Allowance" issued in in related Japanese Application No. 2013-508216 on Jan. 12, 2016.

"Non Final Office Action" issued in related U.S. Appl. No. 14/185,364, dated Feb. 8, 2016.

"Office Action", issued in JP Application No. JP 2011-544647; dated Oct. 29, 2015, Published in: JP.

"Notice of Allowance", issued in related U.S. Appl. No. 14/313,233, Oct. 2, 2015.

\* cited by examiner

MULTISCALE OPTICAL SYSTEM HAVING DYNAMIC CAMERA SETTINGS

CROSS REFERENCE TO RELATED APPLICATIONS

This case is a continuation-in-part of co-pending U.S. patent application Ser. No. 13/095,407 filed Apr. 27, 2011, which is a continuation-in-part of U.S. patent application Ser. No. 12/651,894 (now U.S. Pat. No. 8,259,212), filed 4 Jan. 2010, which claims priority of U.S. Provisional Patent Application 61/142,499, filed Jan. 5, 2009, each of which is incorporated herein by reference in its entirety.

STATEMENT REGARDING FEDERALLY SPONSORED RESEARCH

This invention was made with Government support under Grant Number HR0011-10-C-0073 awarded by the Defense Advanced Research Projects Agency (DARPA). The Government has certain rights in the invention.

FIELD OF THE INVENTION

The present invention relates to optics in general, and, more particularly, to imaging systems.

BACKGROUND OF THE INVENTION

A complex scene includes objects or portions of the scene that are at a wide variety of distances from the camera. In some cases, the scene might have diverse illumination levels, strongly vary in color or polarization throughout the scene, and/or might include objects that move on different time scales.

Digital cameras are the most common imaging system used to image such complex scenes. A typical digital camera contains a single lens (i.e., aperture) that images the scene onto an array of detectors, referred to as a focal-plane array (FPA). Unfortunately, a conventional single-aperture camera only allows one fixed shutter speed, focus position, aperture size, color balance, and polarization per image. As a result, such a camera can not sufficiently capture the diversity of a complex scene, as described above, because typically there is no single combination of aperture stop size, exposure time, focus position, color balancing, and zoom position that can capture the desired level of detail in the scene. This problem is exacerbated when the scene includes a wide area, such as a sporting event, a natural landscape, or even a large room.

Multiple camera systems offer a way to overcome some of the disadvantages inherent to a single-aperture camera. For example, conventional multi-camera systems employ an array of cameras, wherein each images a different portion of a scene. This enables the image to be divided into different zones such that the focus position, aperture size, shutter speed, color balance, and polarization sensitivity could be varied on a zone-by-zone basis as dictated by the range of the objects in the zone, available quantity and hue of illumination, object speed in the zone, and polarization variation due to scattering from oriented surfaces. The images generated by the multiple cameras can then be stitched together to form a composite image of the entire scene. As a result, the composite image can capture at least some of the diversity of a scene.

Although such a multi-camera system overcomes many of the disadvantages inherent to the single-aperture camera, the size of the entrance pupil of each camera in the array must be sufficiently large to resolve features in the scene of interest. Multi-camera imaging systems, therefore, require relatively large lenses and, as a result, tend to be large and bulky. Further, their bulk often gives rise to dead zones in the composite image due to a limit on how close the cameras can be placed to one another.

A compact imaging system having sufficient flexibility to capture highly diverse attributes of a large-area complex scene would be a significant advance in the state of the art.

SUMMARY OF THE INVENTION

The present invention enables simultaneous imaging of a scene having features at diverse ranges. Embodiments of the present invention include a single objective lens and an arrangement of individually controllable microcameras that image the scene through the objective lens. Embodiments of the present invention enable imaging of large-area scenes with high resolution, scenes having a large range of illumination intensity, and scenes having large depth-of-field. Embodiments of the present invention are particularly well suited for applications such as aerial surveillance, panoramic imaging, and imaging of sporting events.

An illustrative embodiment of the present invention comprises an objective lens and an array of microcameras that is arranged about the objective lens such that each microcamera has a unique optical axis that extends radially from the objective lens. Each microcamera includes camera optics and a focal-plane array. Furthermore, each microcamera has independently controllable focus, exposure, gain, magnification (i.e., zoom), and dynamic range.

The objective lens images a three-dimensional scene to form a three-dimensional image field. Each microcamera relays a different image region of this image volume onto its respective focal-plane array, which provides electrical signals that are used to form a digital sub-image of that image region. The digital sub-images of all the image regions are then stitched together to form a composite digital image of the scene.

The focus of each microcamera determines the position within the image field (along the optical axis of that camera) of the image region that is focused onto its respective focal-plane array. As a result, by focusing different microcameras at different distances within the thickness of the three-dimensional image field, different ranges of the scene can be simultaneously imaged. Further, by varying the positions of the focus regions, an arbitrarily shaped surface may be approximated by the union of the focus regions of the microcameras. Embodiments of the present invention, therefore, enable composite images of the scene that can have enhanced depth-of-field. This affords embodiments of the present invention significant advantages over conventional single-aperture cameras, which have a single focal surface that must be varied globally over the entire object, which requires that the available imaging volume is confined to this single uniform surface.

Likewise, embodiments of the present invention have advantages over conventional camera arrays. Embodiments of the present invention can achieve higher spatial resolution than arrays of conventional cameras because the objective lens effectively magnifies the entrance pupil of each microcamera. As a result, each microcamera is the equivalent of a telescope, but in which the equivalent resolution of an array of larger telescopes is realized with a smaller and more economical imaging system.

Because each microcamera has controllable focus, exposure, gain, and dynamic range, multiple measurements of the imaging system can be acquired, with the microcameras assuming various configurations of these parameters. The results of these multiple measurements can then be synthesized into a single composite image which may contain enhanced depth-of-field, dynamic range, or contain three-dimensional or parallax views.

In some embodiments, the objective lens is a monocentric lens that is characterized by a layered structure that includes a spherical central lens element and one or more spherically shaped lens shells, wherein all surfaces have a common center of curvature.

In some embodiments, the objective lens is a non-monocentric lens.

In some embodiments, one or more cameras include a polarization filter, such as a linear polarizer, circular polarizer, elliptical polarizer, etc. In some embodiments, one or more cameras include a tunable polarization filter.

In some embodiments, one or more cameras include one or more wavelength filters. In some embodiments, one or more cameras include a tunable wavelength filter.

In some embodiments, one or more of the microcameras has a controllable stop size, which enables different cameras to have different depths-of-field. As a result, features of interest within a particular microcamera can be sampled while maintaining a desired level of illumination and spatial resolution.

An embodiment of the present invention is an optical system for imaging a scene, the optical system comprising: a first lens, the first lens being operative for forming a three-dimensional image field of the scene; and a plurality of microcameras that is arranged such that each microcamera has a unique optical axis that extends radially from the first lens through the image field, each of the plurality of microcameras having controllable focus and comprising a focal-plane array, and each of the plurality of microcameras being operative for relaying a different image region of the image field onto its respective focal-plane array.

DETAILED DESCRIPTION

Figure 1:
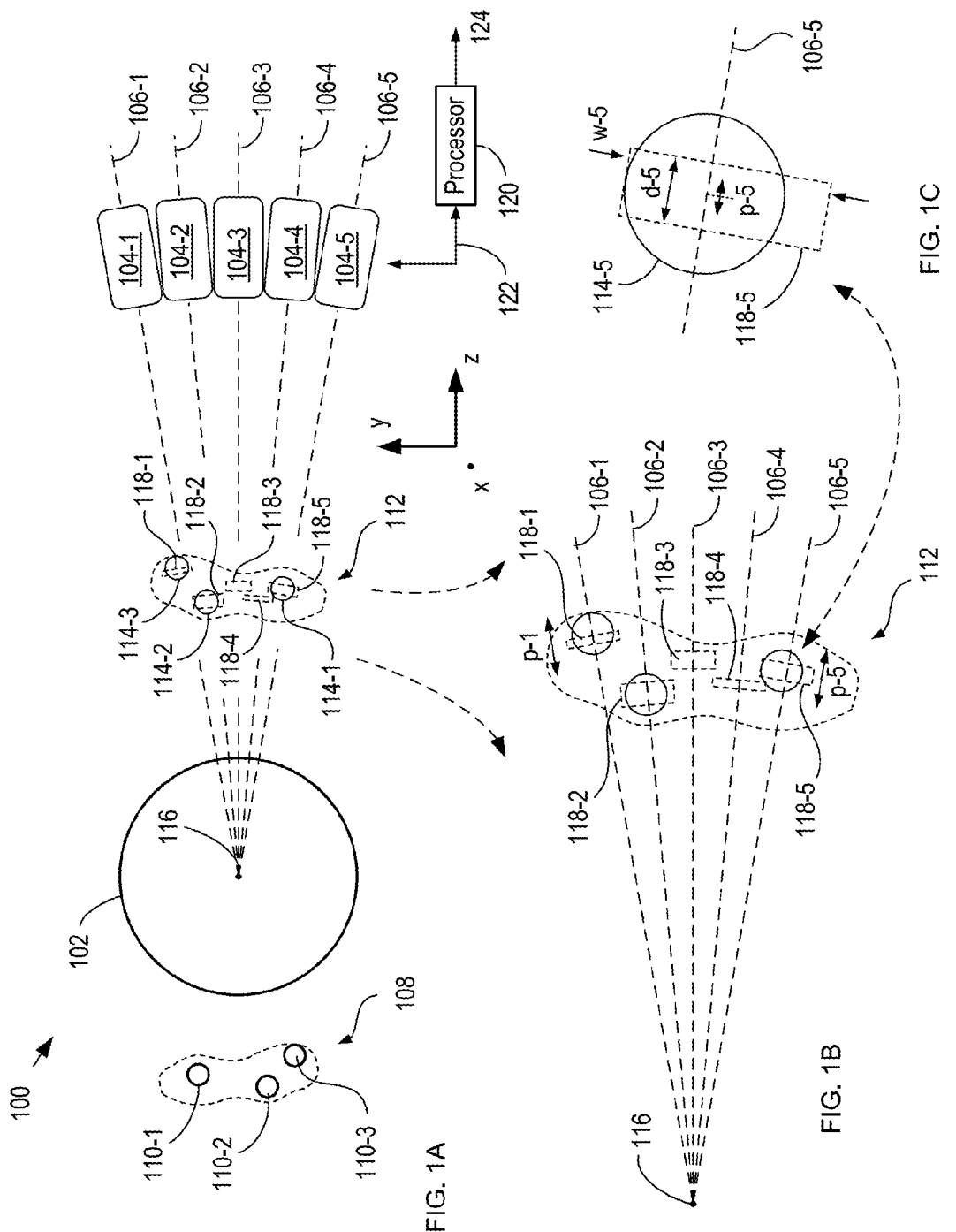
FIG. 1A depicts a schematic drawing of a multiscale optical system in accordance with an illustrative embodiment of the present invention.
FIG. 1B depicts an enlarged view of image field 112.
FIG. 1C depicts an enlarged view of a portion of image field 112.

This application claims priority of parent cases: U.S. patent application Ser. No. 13/095,407, which is a continuation-in-part of U.S. patent application Ser. No. 12/651,894 (now U.S. Pat. No. 8,259,212. As disclosed in the parent cases, a multiscale optical system comprises a single objective lens (which can be either a monocentric lens or a non-monocentric lens) and an array of microcameras, each of which includes a microcamera (e.g., one or more lenses) and a focal-plane array. The objective lens and the microcameras collectively image a scene onto the plurality of focal-plane arrays as a plurality of optical sub-images. Each microcamera has a unique optical axis and images a different image region of the scene through the objective lens to produce a different one of the optical sub-images. The sensor arrays convert the plurality of optical sub-images into digital representations (i.e., digital images) of portions of the scene that can then be combined to form a composite digital image of the entire scene.

The multiscale imaging approach affords advantages over other imaging approaches. First, in a multiscale imaging system, the objective lens and microcameras split the task of imaging the scene. Light collection is done at the objective lens, which forms a real image of the scene at a three-dimensional image field. Due to imperfections, the objective lens imparts aberrations on the formed image. The microcameras are arranged around the image field and each microcamera relays an image region of the aberrated image onto its corresponding planar sensor array to form an optical sub-image of that image region of the scene. In addition to relaying its respective image region of the aberrated image, each microcamera also at least partially corrects aberrations in its relayed image region (i.e., it reduces the magnitude of at least one aberration). This functional separation enables each of the collecting and processing functions to be individually improved without significantly comprising the design of the other. It also enables a large-scale objective lens to be used with a large-count multi-aperture array, thereby reducing the trade-off between geometric aberration and field-of-view.

The multiscale imaging approach also enables two adjacent microcameras to gather rays from the same image point by locating the microcameras at positions displaced from the image field but near one another laterally. Such an arrangement enables light from a given point image to always be captured by at least one microcamera. As a result, blind spots due to lateral spacing between adjacent sensor arrays are avoided.

Second, by providing wavefront correction at the optics of the microcameras to correct aberrations introduced by the large-scale objective lens, the design complexity of the objective lens can be significantly reduced. This also enables faster collection optics, which reduces overall system volume.

Third, multiscale imaging is capable of improved image resolution.

Fourth, manufacturing cost and complexity can be significantly lower for a multiscale imaging system. Smaller lenses are better at providing wavefront correction because: 1) wavefront correction and image formation both yield geometric solutions with less wavelength-scale error over smaller apertures; and 2) manufacturing of complex lens surfaces is much easier in smaller scale systems.

In the present invention, a multiscale imaging system includes microcameras having one or more controllable camera settings, such as focus, exposure, gain, magnification, and dynamic range. Controllable focus enables the microcameras to focus at diverse ranges with overlapping image regions. In other words, different microcameras can image different depths within the three-dimensional image field provided by the objective lens. Controllable magnification enables control over the amount of overlap between the images formed by different cameras. As a result, portions of the scene can be imaged by multiple cameras having different illumination level, dynamic range, color filtering, etc. By employing various configurations of focus, exposure, gain, and dynamic range among the microcameras, a composite image can be reconstructed such that it has enhanced depth-of-field, enhanced dynamic range, includes tomographic object reconstruction, is substantially three-dimensional, and/or includes parallax views of the scene.

FIG. 1A depicts a schematic drawing of a multiscale optical system in accordance with an illustrative embodiment of the present invention. System 100 comprises objective lens 102 and microcameras 104-1 through 104-5.

FIG. 1B depicts an enlarged view of image field 112.

FIG. 1C depicts an enlarged view of a portion of image field 112.

Objective lens 102 is a monocentric lens, wherein all of the optical surfaces of the lens have a center of curvature located at center point 116. A monocentric lens identically focuses light coming from any direction, which enables it to view a wide area. Objective lens 102 is described in detail below and with respect to FIG. 3.

Each of microcameras 104-1 through 104-5 (referred to, collectively, as microcameras 104) includes camera optics and a focal plane array. Microcameras 104 are described in detail below and with respect to FIG. 4. Although system 100 includes five microcameras, one skilled in the art will recognize that any practical number of microcameras can be included in system 100.

Microcameras 104 are arranged in a substantially circular arrangement about objective lens 102 such that each microcamera defines a unique optical axis that extends radially from center point 116 of the objective lens. Specifically, microcamera 104-1 has optical axis 106-1, microcamera 104-2 has optical axis 104-2, and so on. Each of optical axes 106-1 through 106-5 extends through center point 116 of objective lens 102. It should be noted, however, that in some embodiments, objective lens 102 is a non-monocentric lens. In such embodiments, optical axes 106-1 through 106-5 would typically extend through the center point of the exit aperture of the non-monocentric objective lens.

Each of microcameras 104 relays the illumination from a different portion (denoted as image regions 118-1 through 118-5 in FIG. 1A) of the three-dimensional image volume to be captured on its respective focal-plane array.

Figure 2:
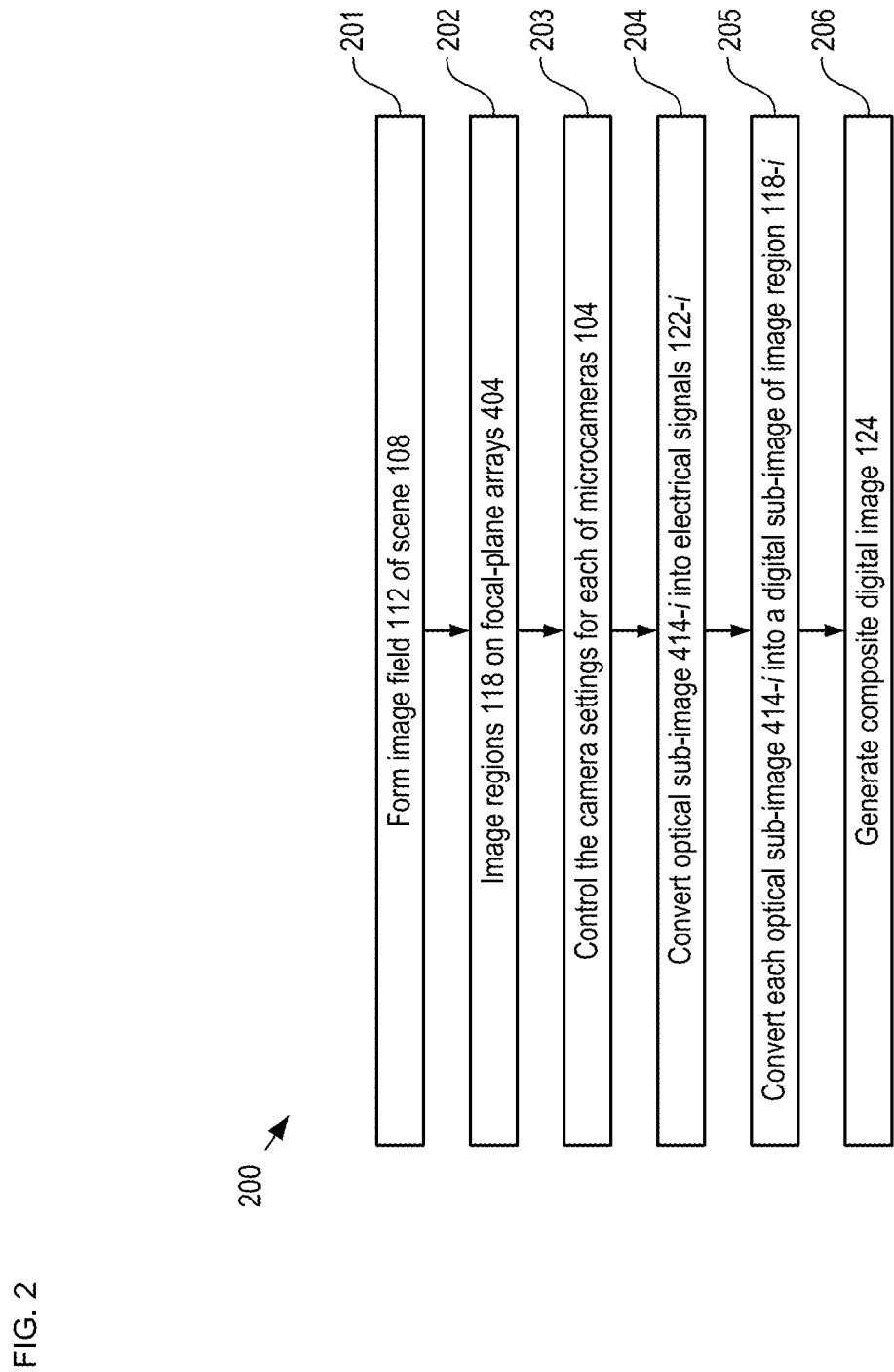
FIG. 2 depicts operations of a method suitable for imaging a scene in accordance with the illustrative embodiment of the present invention.

FIG. 2 depicts operations of a method suitable for imaging a scene in accordance with the illustrative embodiment of the present invention. Method 200 begins with operation 201, wherein objective lens 102 forms a real image of scene 108 at image field 112.

Scene 108 includes objects 110-1 through 110-3, which are located at different distances from lens 108. As a result, image field 112 is a three-dimensional image field that has commensurate lateral shape and depth along the z-direction. Objects 110-1 through 110-3 appear in image field 112 as projections 114-1 through 114-3, respectively.

Figure 3:
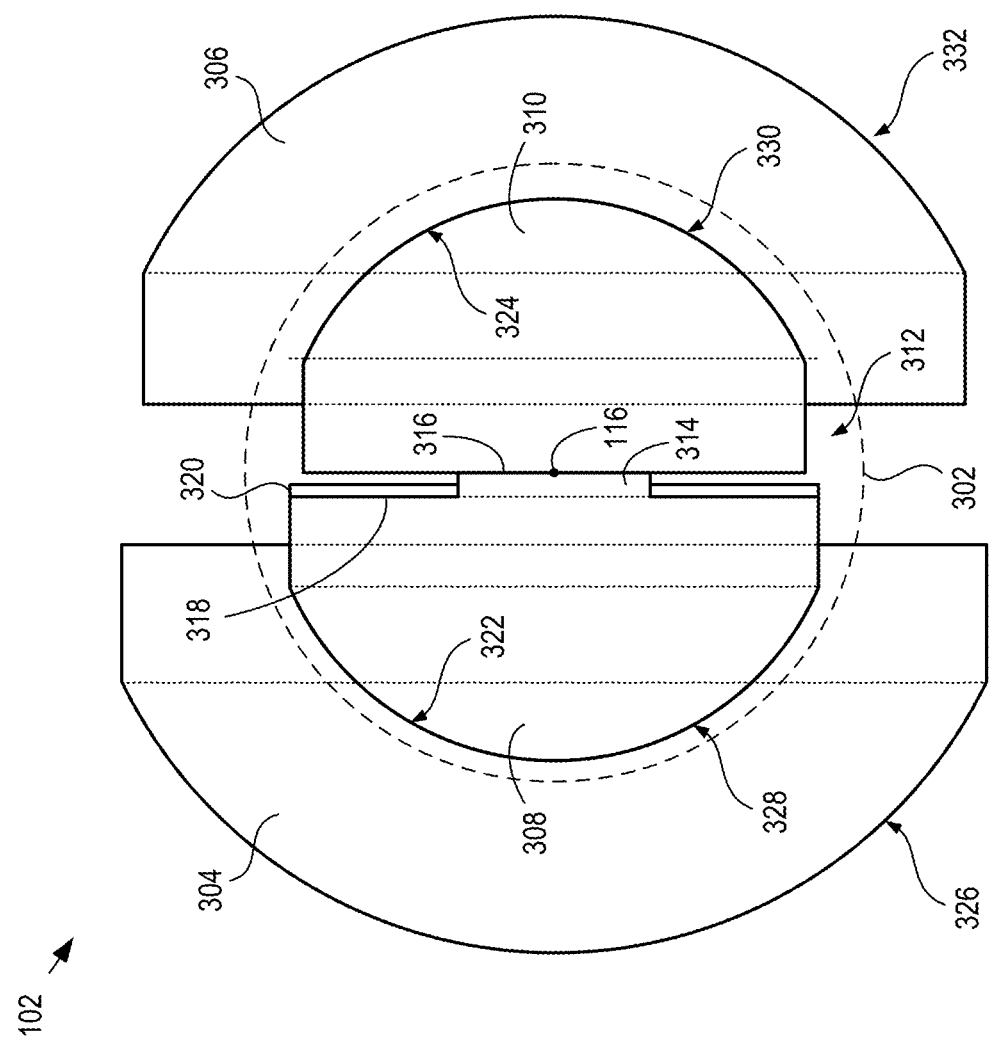
FIG. 3 depicts a schematic drawing of a cross-sectional view of a monocentric objective lens in accordance with the illustrative embodiment of the present invention.

FIG. 3 depicts a schematic drawing of a cross-sectional view of a monocentric objective lens in accordance with the illustrative embodiment of the present invention. Objective lens 102 is a multi-element monocentric lens comprising lens element 302, entry lens shell 304, and exit lens shell 306.

Lens element 302 comprises hemispheres 308 and 310. Each of hemispheres 308 and 310 comprise BK7 glass. As a result, lens element 302 is characterized by a refractive index of approximately 1.516800 and an Abbe number of approximately 64.167336. Although BK7 glass is used for lens element 302, in some embodiments, lens element 302 comprises a different material. Materials suitable for use in lens element 302 include, without limitation, calcium fluoride, fused silica, BK-7 glass, SK-7 glass, fluorocrown glass, magnesium fluoride, plastics, water, and perfluorooctane.

Hemispheres 308 and 310 are joined at a central plane comprising center point 116. Hemisphere 308 has a diameter of approximately 118.644 millimeters (mm), while hemisphere 310 has a diameter of approximately 31.62 mm.

Hemisphere 308 comprises pedestal 314. Pedestal 314 is typically formed by grinding back or etching surface 316 of hemisphere 308 outside the area of the pedestal to form relieved surface 318. Relieved surface 318 is then coated with layer 320 so that pedestal 314 and layer 320 collectively define an optical stop in the interior of lens 102. Layer 320 is a layer of opaque or absorbing material disposed on relieved surface 318 in conventional fashion. In some embodiments, the process used to form relieved surface 318 leaves the surface sufficiently opaque to obviate layer 320.

When hemispheres 308 and 310 are joined to form lens element 302, their mating surfaces collectively form a substantially continuous region of lens material. As a result, these surfaces do not constitute optical surfaces for the purpose of this description, since light that passes through them does not see a material change.

Entry lens shell 304 is a curved shell section having a substantially spherical shape. In other words, entry lens shell 304 is a portion of a spherical shell. Entry lens shell 304 comprises type F2 optical glass, which is characterized by a refractive index of approximately 1.620040 and an Abbe number of approximately 36.366491. Entry lens shell 304 has a substantially uniform thickness between spherical surfaces 326 and 328 of approximately 35.568 mm.

Exit lens shell 306 is a curved shell section having a substantially spherical shape. In other words, exit lens shell 306 is a portion of a spherical shell. Exit lens shell 306 comprises type F2 optical glass. Exit lens shell 306 has a substantially uniform thickness between spherical surfaces 330 and 332 of approximately 35.568 mm.

Table 1 below summarizes the design parameters for objective lens 102. The surface designations are based on the ray trace of system 100 provided in FIG. 5A.

TABLE 1

Design parameters for a representative monocentric objective lens.

| Surface | Radius (mm) | Thickness (mm) | Glass (Schott catalog) | Semi-Diameter (mm) | Comments |
|---|---|---|---|---|---|
| 1 | 64.8 | 35.568 | F2 Optical Glass (n = 1.620040, V = 36.366491) | 121.598 | Entry Surface |
| 2 | 29.232 | 29.232 | N-BK7 (n = 1.516800, V = 64.167336) | 118.644 | |
| 3 | Infinity | 29.232 | N-BK7 | 31.62 | Center Plane |
| 4 | −29.232 | 35.568 | F2 Optical Glass | 56.138 | |
| 5 | −64.8 | 47.099 | | 117.454 | Exit Surface |

The inclusion and design of entry lens shell 304 and exit lens shell 306 in objective lens 102 enables entry lens shell 304, lens element 302, and exit lens shell 306 to collectively reduce the magnitude of each of spherical aberration and chromatic aberration from the magnitude of these aberrations introduced by lens element 302 individually.

In addition, the spherical symmetry of optical surfaces 326, 328, 322, 324, 330, and 332 results in lens 102 introducing only field-independent aberrations into the light from scene 108. The primary source of aberration introduced by a spherically symmetric lens, such as lens 102, arises from the refraction of light rays as they enter the front surface (i.e., optical surface 326) from free space. It is an aspect of the present invention that the layers of lens 102 are designed so that the collective refraction introduced at the rest of the optical surfaces (i.e., optical surfaces 328, 322, 324, 330, and 332) produce negative spherical aberration that, at least partially, offsets positive spherical aberration introduced at optical surface 326.

Objective lens 102 is designed to be substantially achromatic at wavelengths of approximately 486 nm, 589, and 656 nm.

One skilled in the art will recognize that the design of objective lens 102 provided here is merely one example of a suitable monocentric objective lens and that myriad alternative designs suitable for objective lens 102 exist. Some examples of other monocentric lenses suitable for use with the present invention are described in detail in the parent application to this case—U.S. patent application Ser. No. 13/095,407.

The use of a monocentric lens as objective lens 102 limits the introduction of aberrations by the lens to mainly spherical aberrations (neglecting image curvature and image distortion) because of the symmetry of the lens, which leads to the introduction by the lens of aberrations that are independent of the field point. As a result, objective lens 102 is preferably a monocentric lens.

At operation 202, microcameras 104-1 through 104-5 image regions 118-1 through 118-5, respectively, of image field 112 by relaying each image region onto its respective focal-plane array. In other words, each microcamera 104 images a different portion of scene 108 through the same objective lens (i.e., objective lens 102). This enables each of microcameras 104 to achieve a higher spatial resolution than can be achieved by prior-art multi-camera imagers. The improved spatial resolution of the present invention arises from the fact that objective lens 102 effectively magnifies the entrance pupil of each of microcameras 104 so that the microcamera is the equivalent of a larger telescope. As a result, system 100 provides the equivalent resolution of an array of telescopes, but the use of a common objective enables system 100 to be smaller and less expensive.

Figure 4:
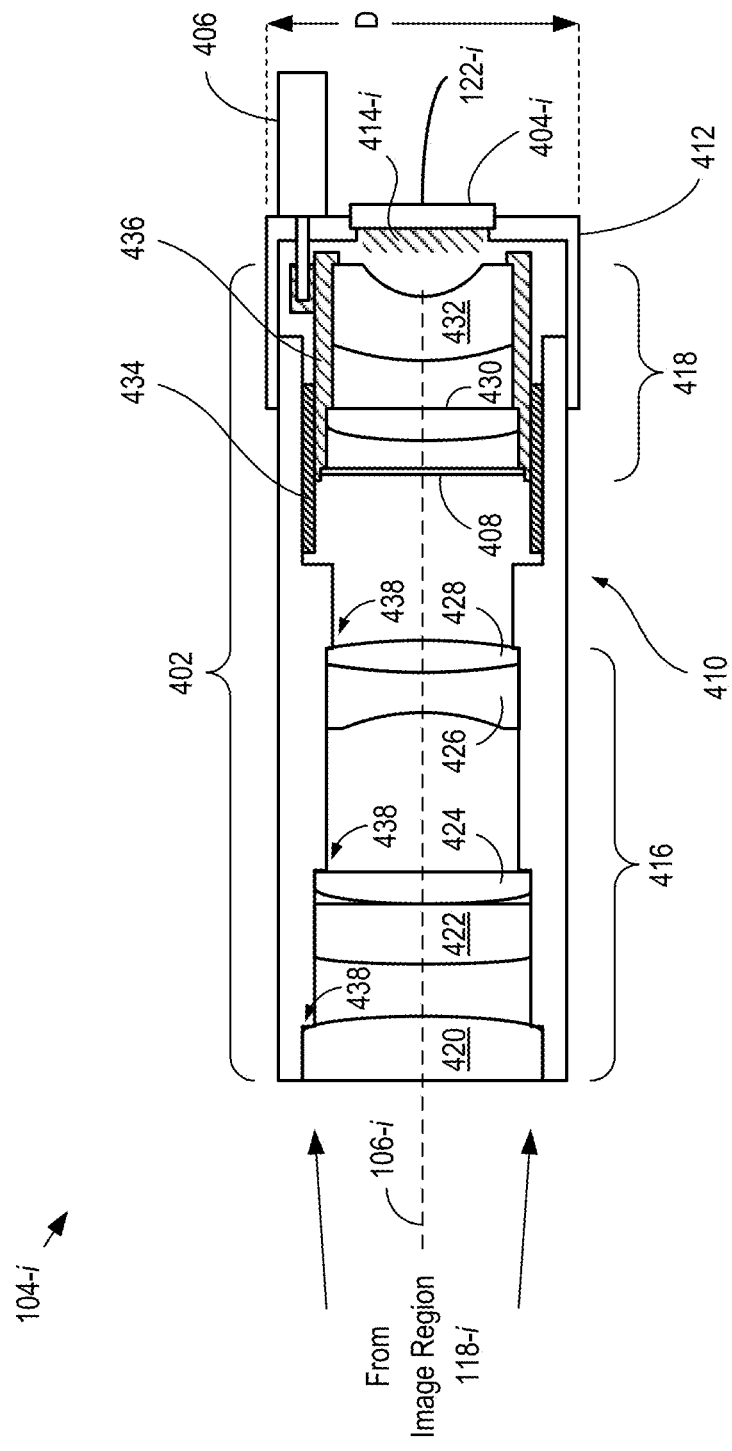
FIG. 4 depicts a schematic drawing of a cross-section of a microcamera in accordance with the illustrative embodiment of the present invention.

FIG. 4 depicts a schematic drawing of a cross-section of a microcamera in accordance with the illustrative embodiment of the present invention. Microcamera 104-i comprises camera optics 402, focal-plane array 404-i, linear actuator 406, filter 408, lens body 410, and end cap 412. Microcamera 104-i is designed to relay image region 118-i as optical sub-image 414-i onto focal-plane array 404-i.

Camera optics 402 includes fixed-lens system 416 and movable-lens system 418, which collectively focus image region 118-i as optical sub-image 414-i onto focal-plane array 404-i.

Lens body 410 is a conventional lens tube for holding fixed-lens system 416 and movable lens 418 in position along optical axis 106-i. Lens body 410 typically comprises a material having a low thermal-expansion coefficient. Materials suitable for use in lens body 410 include, without limitation, Invar, super Invar, titanium, Zerodur, fused silica, composite materials, and the like.

End cap 412 is a structurally rigid cap that mounts on the end of lens body 410. End cap 412 typically comprises the same material as lens body 410. End cap 412 receives and locates focal plane array 404-i and provides a mounting surface through which actuator 406 operatively couples carriage 434.

Fixed-lens system 416 includes lenses 420, 422, 424, 426, and 428, each of which is held at a fixed distance from focal-plane array 404-i in conventional fashion by precision-machined shoulders 438 of lens body 410.

Movable-lens system 418 includes lenses 430 and 432 and filter 408, each of which is mounted in carriage 434.

Figure 5A:
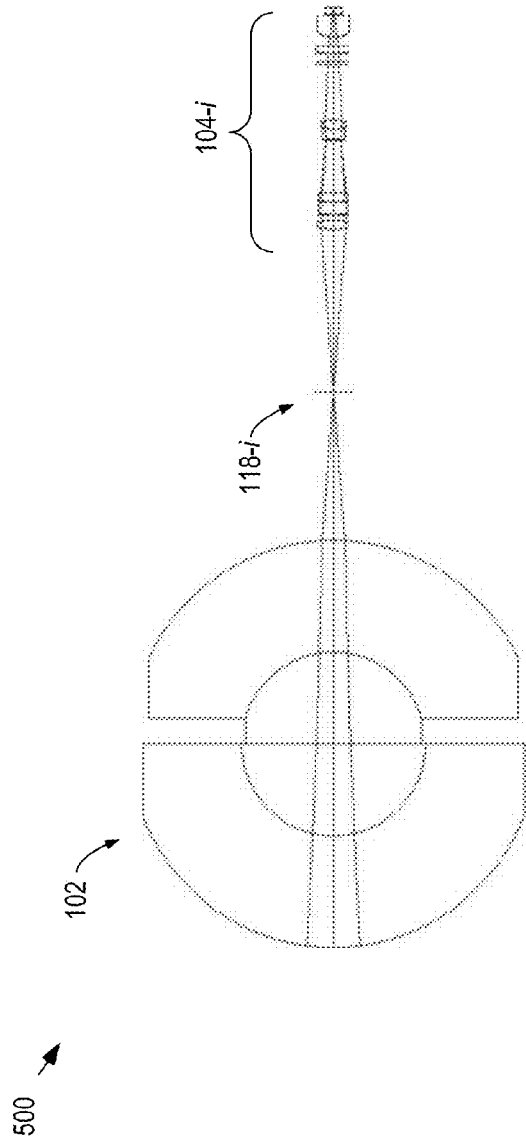
FIG. 5A depicts a ray trace model of a multi-scale imaging system in accordance with the illustrative embodiment of the present invention.

FIG. 5A depicts a ray trace model of a multi-scale imaging system in accordance with the illustrative embodiment of the present invention. Trace 500 depicts the paths of light rays through system 100.

Figure 5B:
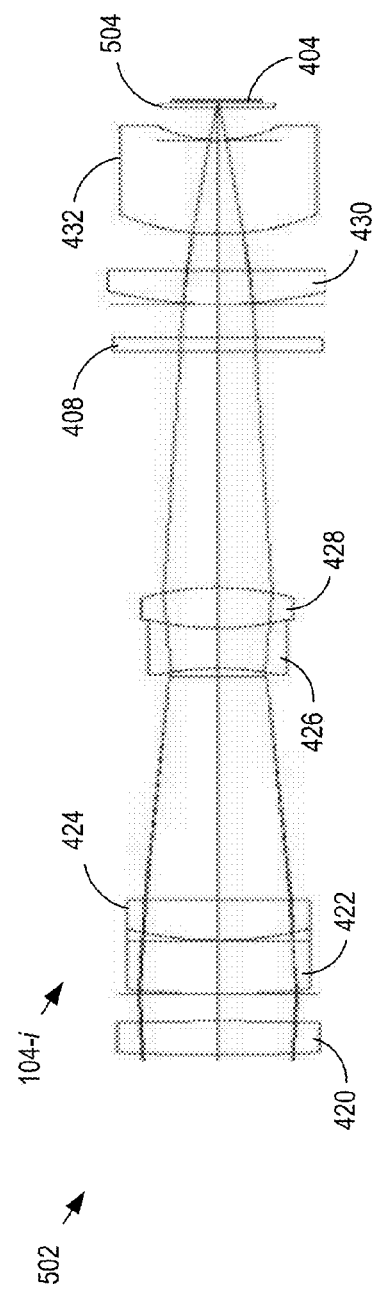
FIG. 5B depicts a detailed view of a ray trace model through microcamera 104-$i$.

FIG. 5B depicts a detailed view of a ray trace model through microcamera 104-i. Trace 502 depicts the paths of light rays through camera optics 402, including conventional coverplate 504, disposed over focal-plane array 404-i.

Table 2 below summarizes an exemplary prescription for camera 104-i as depicted in model 502. The surface designations are based on the ray trace of system 100 provided in FIGS. 5A and 5B.

TABLE 2

Design parameters for a microcamera having multiple movable elements.

| Surface | Radius (mm) | Thickness (mm) | Glass (Schott catalog) | Semi-Diameter (mm) | Comments |
|---|---|---|---|---|---|
| 6 | Infinity | 52 | | 11.15252 | |
| 7 | 89.27349 | 2.5 | N-SF2 (n = 1.647690, V = 33.82.0209) | 10.4 | |
| 8 | −89.27349 | 2 | | 10.4 | |
| 9 | 31.38401 | 4 | N-SF2 | 9.4 | |
| 10 | 13.41187 | 3 | N-LAK12 (n = 1.677900, V = 55.199566) | 9.4 | |
| 11 | Infinity | 16.59874 | | 8.918359 | |
| 12 | Infinity | 0.6 | | 4.933258 | Stop |
| 13 | −9.953985 | 3 | N-SF2 | 5.977128 | |
| 14 | 10.48493 | 3 | N-BAK1 (n = 1.572500, V = 57.549310) | 7.097265 | |
| 15 | −10.48493 | 17.56672 | | 7.786965 | |
| 16 | Infinity | 1 | N-BK7 | 10.67388 | IR Cutoff |
| 17 | Infinity | 2.5 | | 10.77829 | |
| 18 | 16.93924 | 2.5 | N-SK14 (n = 1.603110, V = 60.596819) | 11.30413 | Movable Lens 430 |
| 19 | Infinity | 2.7 | | 11.06081 | |
| 20 | 9.409246 | 7 | N-SF6 (n = 1.805180, V = 25.359729) | 10.15941 | Movable Lens 432 |
| 21 | 5.303599 | 2.4 | | 6.184919 | |
| 22 | Infinity | 0.4 | N-BK7 | 5.793407 | Cover Glass |
| 23 | Infinity | 0.125 | | 5.733929 | |

The prescriptions provided in Tables 1 and 2 above collectively provide a multiscale imaging system wherein each microcamera has an approximately 26 microradian instantaneous field-of-view onto 1.4 micron pixel sensors. The field-of-view for each microcamera is approximately 5.2 degrees, and has a physical cone-angle of approximately 3.6 degrees. The design wavelengths are 486, 589, and 656 nm.

It should be noted that the prescription provided in Table 2 is suitable for each of microcameras 104. As a result, microcameras 104 can be readily mass-produced.

One skilled in the art will recognize that the design of microcamera 104-*i* provided here is merely one example of a suitable microcamera and that myriad alternative designs suitable for microcamera 104-*i* exist.

Returning now to FIG. 4, carriage 436 is a precision-machined carrier that is sized to fit snugly within bearing sleeve 432 but be readily moved by linear actuator 406. Carriage 436 is typically made of a lightweight, rigid material, such as aluminum.

Bearing sleeve 434 is a precision cylinder fabricated from a conventional, low-friction material, such as a composite material or polymer (e.g., a Delrin/Teflon blend). Bearing sleeve 434 lines the inside surface of lens body 410 along a portion over which carriage 436 is movable to facilitate motion of the carriage.

Filter 408 is a polarization filter for isolating the polarization properties of the light from image region 118-*i*. Polarization filters suitable for use in filter 408 include, without limitation, linear polarizers, circular polarizers, elliptical polarizers, and the like. In some embodiments, filter 408 is a wavelength filter. In some embodiments, filter 408 includes both a polarization filter and a wavelength filter. In some embodiments, filter 408 includes one or more reconfigurable elements, such as liquid-crystal tunable polarizers, wave plates, tunable wavelength filters, etc. In some embodiments, filter 408 is a thin-film filter disposed on one of the lens surfaces of camera optics 402—typically, the entry surface of lens 430.

The inclusion of filter 408 in microcamera 104-*i* enables greater flexibility for system 100. For example, two microcameras can be controlled to overlap their image regions such that the same portion of the scene is observed by both microcameras. By observing the same image region of the scene with differently configured microcameras, different polarization properties or observed wavelength bands in the region can be examined. Preferably, camera optics 402 includes an infrared cutoff filter and filter 408 is placed in the microcamera ray path near its position.

At operation 203, the camera settings for each of microcameras 104 are controlled. Camera settings that are controllable for camera 104-*i* include focus and effective aperture, and typically also include magnification, exposure, gain, and dynamic range.

In operation 203, each of microcameras 104 is focused at a desired image region 118.

The ability to controllably focus each of microcameras 104 provides system 100 with significant advantages over prior-art imaging systems—specifically, it enables the system to provide enhanced depth-of-field or three-dimensional characteristics in composite digital image 124. It should be noted, however, that implementation of a multiscale imaging system requires microcameras that are spatially compact perpendicular to each corresponding optical axis, which enables the microcameras to be densely packed around objective lens 102. The need for lateral compactness places a stringent constraint on the mechanical components of each microcamera—in particular, its focusing system.

For conventional cameras or camera arrays, dynamic focus is achieved by translating specific optical elements relative to others via motorized threaded lens tubes, solenoid type motors (voicecoils), or other methods that place the driving mechanism in close proximity to the moving lenses. Such an approach to dynamic focus is not practical for embodiments of the present invention, however, due to the limited space available around the focus elements.

In contrast to conventional camera focusing mechanics, therefore, the focus of microcamera 104-*i* is controlled via an in-line, narrow profile focusing mechanism. Microcamera 104-*i* is focused by translating carriage 434 within bearing sleeve 434 along optical axis 106-*i*. Carriage 436 is moved along optical axis 106-*i* by linear actuator 406. The motion of carriage 436 controls the position of movable-lens system 418 relative to focal-plane array 404-*i* and, thus, the focus of microcamera 104-*i*.

Linear actuator 406 is a conventional actuator suitable for imparting linear motion on carriage 436 relative to bearing sleeve 434. Actuators suitable for use in linear actuator 406 include, without limitation, piezo based ultrasonic motors (e.g. Squiggle motors from Newscale Technologies, etc.), stepper motors, servomotors, magnetic solenoids, and geared DC motors, and the like. The choice of linear actuator is based, in part, on the resolution with which movable-lens system 418 must be moved, which is, in turn, application dependent.

It is an aspect of the present invention that dynamic focus for a microcamera is achieved via a mechanism whose lateral extent is substantially within diameter, D, of lens body 410 and end cap 412 (i.e., within the cross-sectional area of the optical portion of the microcamera). In other words, a dynamic focusing system in accordance with the present invention does not significantly increase the lateral footprint of the microcamera as a whole. As a result, linear actuator 406 and its associated electronics are mounted behind focal-plane array 404-*i* where there is ample room for such components. Mounting linear actuator 406 near focal-plane array 404-*i* also allows the electronics for both elements to be integrated more compactly and assembled as a single unit.

It should be noted that the in-line, narrow profile focusing mechanism of microcamera 104-*i* is merely one example of a focusing mechanism suitable for use with embodiments of the present invention. In some embodiments, at least one of microcameras 104 includes a different focusing mechanism that enables a microcamera that is spatially compact perpendicular to its corresponding optical axis. Approaches for dynamic focus suitable for use with the present invention include, without limitation, electrically actuated lenses (e.g., lenses from Holochip Corp., etc.), adaptive optics lenses, micromechanically active lenses, reconfigurable diffractive lenses, and the like.

It should be further noted that the design of microcamera 104-*i* in the illustrative embodiment is image-side telecentric. As a result, the incident rays for all image regions 118 are substantially normally incident onto their respective focal-plane arrays. By providing microcamera 104-*i* with image-side telecentricity, points within scene 108 that are along a radial line through center point 116 of objective lens 102 have image centroids that are mapped to the same position on focal-plane array 404-*i*. This enables the angular resolution of system 100 to be substantially invariant with distance.

In addition, for an image-side telecentric microcamera, a given object point in scene 108 has an image centroid the remains substantially at the same position as the microcamera is refocused to a different range. This is particularly desirable for embodiments of the present invention, wherein different microcameras are focused to different ranges.

Figure 6:
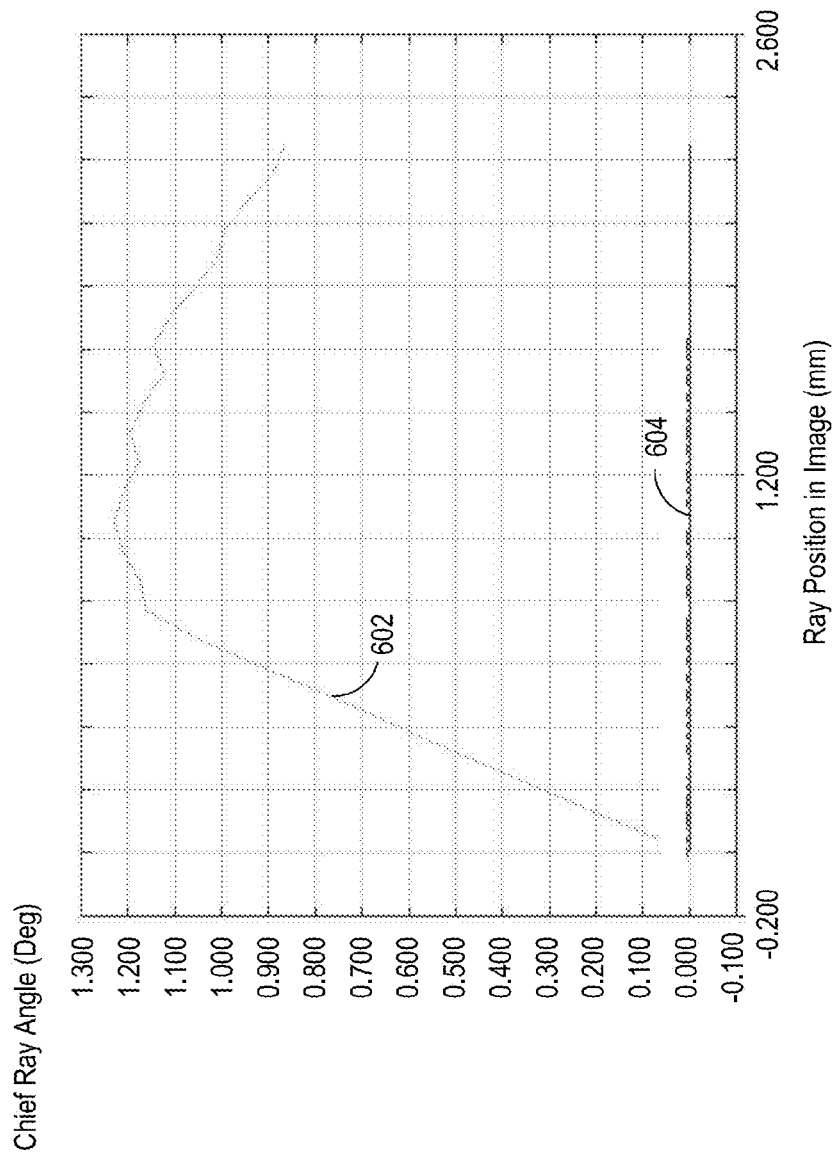
FIG. 6 depicts the chief ray angle through a microcamera as a function of position on the focal-plane array in accordance with the illustrative embodiment of the present invention.

FIG. 6 depicts the chief ray angle through a microcamera as a function of position on the focal-plane array in accordance with the illustrative embodiment of the present invention. Plot 600 depicts the chief ray angle through microcamera 104-*i* as a function of position on the focal-plane array 404-*i*.

Trace 602 denotes the sagittal ray, while trace 604 denotes the tangential ray. It can be readily seen from plot 600 that the chief ray angle remains within 1.3 degrees of normal throughout the field.

It should be noted that, if the microcameras were not image-side telecentric, then the magnifications of the images of two adjacent microcameras would vary with their respective focuses. When the two images of the adjacent microcameras are overlaid, therefore, the magnification of the two images must be accounted for or the images would not be properly registered. Because the range and magnification of a microcamera depends on its focus position, the focus position must be known to a sufficient accuracy to compensate for difference in magnifications in adjacent microcameras. By reducing the sensitivity of the magnification to the focus position by designing microcameras 104 with image-side telecentricity, errors in estimation of the magnification have a reduced effect. Alternatively, it can be possible characterize or assume a fixed magnification without the need to measure the focus position of a microcamera.

Figure 7B:
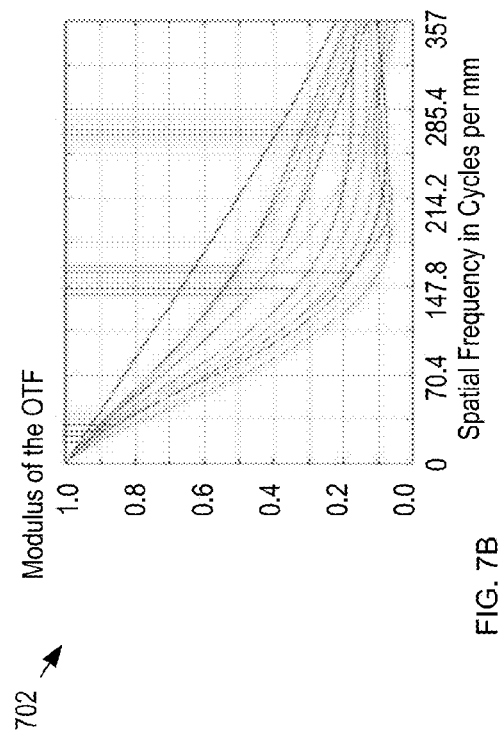
FIGS. 7A and 7B depict modulation transfer functions of a microcamera at different focus positions in accordance with the illustrative embodiment of the present invention.
Figure 7A:
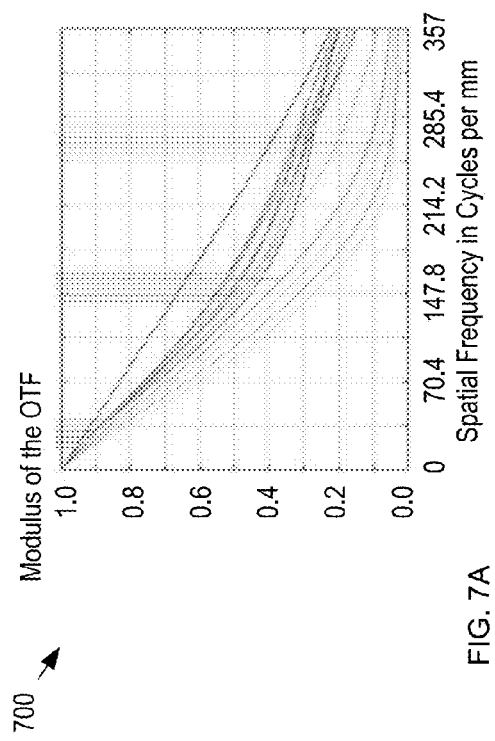

FIGS. 7A and 7B depict modulation transfer functions of a microcamera at different focus positions in accordance with the illustrative embodiment of the present invention.

Plot 700 depicts the transfer function for microcamera 104-*i* at infinity, which shows the angular magnification (or effective focal length) is 51.43 mm.

Plot 702 depicts the transfer function for microcamera 104-*i* focused at a 10 meter object distance, which shows the angular magnification is 51.70 mm—a difference of approximately 0.5% from that shown in plot 700.

Returning now to operation 203, the effective aperture of each of microcameras 104 is also controlled. This enables control of each of the portions of image field 112 that are in focus along optical axes 106 (i.e., the depth-of-field, d-*i*, of image region 118-*i*).

The effective aperture of microcamera 104-*i* is based on the illumination intensity on focal plane array 404-*i*, as well as the stop size of the microcamera.

In some embodiments, filter 408 is operative for controlling the illumination intensity on focal-plane array 404-*i* without reducing the stop diameter of microcamera 104-*i*. In some embodiments, the stop sizes of one or more microcameras may also be independently adjusted so that, within a particular microcamera, the depth-of-field contains features of interest but maintains a sufficient level of sampled illumination and resolution. In some embodiments, filter 408 does not control the illumination intensity on focal plane array 404-*i*.

Also in operation 203, the magnification of microcamera 104-*i* is controlled. This enables control of the lateral extent, w-*i*, of image region 118-*i*.

In some embodiments, one or more lenses of fixed-lens system 416 are mounted in a second carriage that is within a second bearing sleeve inside optical tube 410. This enables independent motion of multiple lenses or groups of lenses, relative to focal-plane array 404-*i*, which provides another means of changing the focal length or magnification, and the focus distance.

In some applications, the high-resolution capability of system 100 is more than is necessary. While a single high resolution image could be captured by system 100 and then numerically downsampled to reduce its resolution, it is often preferable to simply optically vary the focal length of magnification (i.e., zoom) to avoid the separate step of numerical downsampling. Further, optical zooming enables an increase in the overlap of the fields between the microcameras, which enables each microcamera to observe a larger area of the image. Reduction in the focal length also allows decreases the size of the area on the focal plane array to be sampled, enabling a potential power reduction, as well as a reduction of communication and data processing bandwidth.

Still further, controlling focus, depth-of-field, and magnification of microcamera 104-*i* enables control over the position and volume of image region 118-*i*. This affords embodiments of the present invention significant advantage over imaging systems of the prior art because the present invention enables an arbitrarily shaped surface to be approximated by the union of the focus regions of the microcameras. For example, as depicted in FIGS. 1A-C, image field 112 includes image points 114-1 through 114-3, which correspond to object points 110-1 through 110-3, respectively. If a conventional prior-art single-aperture camera was used to image scene 108, the portion of the object that could be imaged would be restricted by the Scheimpflug condition which requires that the object region in focus is the image of the focal plane array through optical system's single optical axis. The present invention circumvents the Scheimpflug condition by providing a separate optical axis and focal plane array for each microcamera so that the object region in focus can be much more flexibly partitioned.

In some cases, it is desirable to overlap the image regions of some microcameras to enable them to sample the same portion of a scene. By controlling different microcameras used to the same scene portion such that the microcameras provide diverse information, such as polarization, wavelength, etc., a more complete measurement of the properties of that scene portion can be developed.

Figure 8:
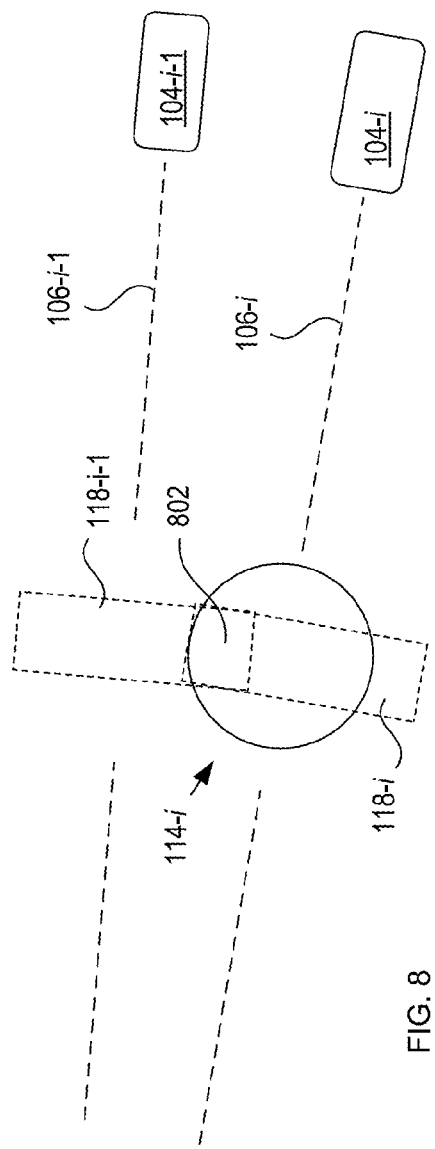
FIG. 8 depicts an exemplary view of a scene portion that is observed by multiple microcameras in accordance with the illustrative embodiment of the present invention.

FIG. 8 depicts an exemplary view of a scene portion that is observed by multiple microcameras in accordance with the illustrative embodiment of the present invention. View 800 depicts object 114-*i* and image regions 118-*i* and 118-*i*-1, wherein cameras 104-*i* and 104-*i*-1 are controlled such that image regions 118-*i* and 118-*i*-1 overlap in portion 802.

Figure 9:
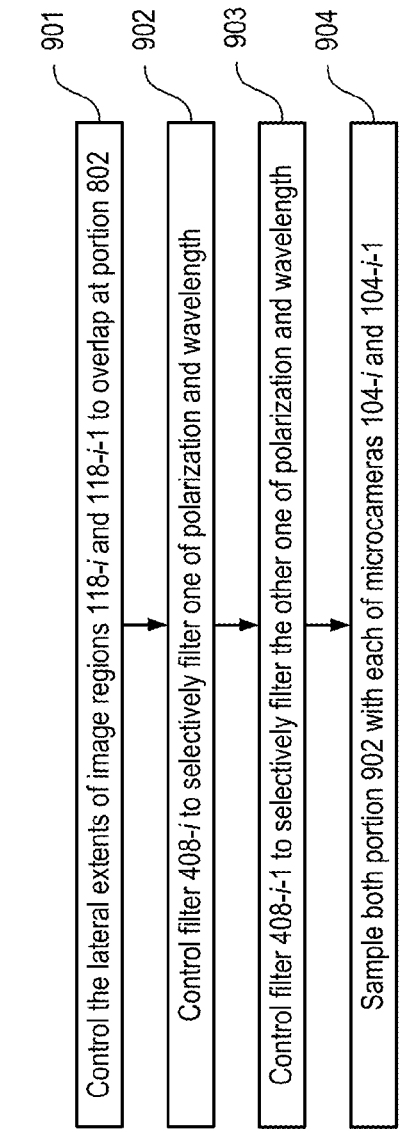
FIG. 9 depicts optional sub-operations of operation 203 suitable for obtaining diverse information from a portion of scene 108.

FIG. 9 depicts optional sub-operations of operation 203 suitable for obtaining diverse information from a portion of scene 108. Operation 203 begins with sub-operation 901, wherein the lateral extent of each of image regions 118-*i* and 118-*i*-1 is controlled such that they overlap in image portion 802.

At operation 902, filter 408-*i* is controlled to selectively filter either polarization or wavelength in image region 118-*i*.

At operation 903, filter 408-*i*-1 is controlled to selectively filter the other one of polarization or wavelength in image region 118-*i*-1. For example, filter 408-*i* could be configured as a polarization filter while filter 408-*i*-1 is configured as a wavelength filter, or visa-versa.

At operation 904, by virtue of the overlap of image regions 118-*i* and 118-*i*-1 in portion 802, portion 802 is independently sampled to measure both polarization and wavelength.

At operation 204, focal-plane array 404-*i* converts optical sub-image 414-*i* into electrical signals 122-*i* and provides them to processor 120.

Focal-plane array 404-*i* comprises a two-dimensional arrangement of 10 million charge-coupled device (CCD) elements 502 having a size of approximately 1.4 microns. As a result, microcamera 104-*i* is capable of providing 10 million individual electrical signals that are based on the intensity of light from 10 million image points in image region 118-*i*. The total size of sensor array 106 is suitable for completely sampling an optical sub-image having a diameter within the range of approximately 3 mm to approximately 4 mm. In some embodiments of the present invention, focal-plane array 404-*i* comprises a two-dimensional arrangement of another photosensitive device, such as a CMOS sensor, photodetector, avalanche photodiode, and the like. It will be clear to one skilled in the art how to specify, make, and use focal-plane array 404-*i*.

At operation 205, processor 120 converts each of electrical signals 122-*i* into a digital sub-image of image region 118-*i*.

At operation 206, image processor 120 generates composite digital image 124 based on the plurality of digital sub-images of image regions 118.

In some embodiments of the present invention, operations 203 through 205 are repeated several times with different configurations of camera settings for cameras 104. The digital sub-images from all of these measurements are then synthesized into digital image 124, which enables a digital image containing properties such as:

i. enhanced depth-of-field; or
ii. enhanced dynamic range; or
iii. three dimensionality; or
iv. parallax views of scene 108; or
v. any combination of i, ii, iii, and iv.

Figure 10:
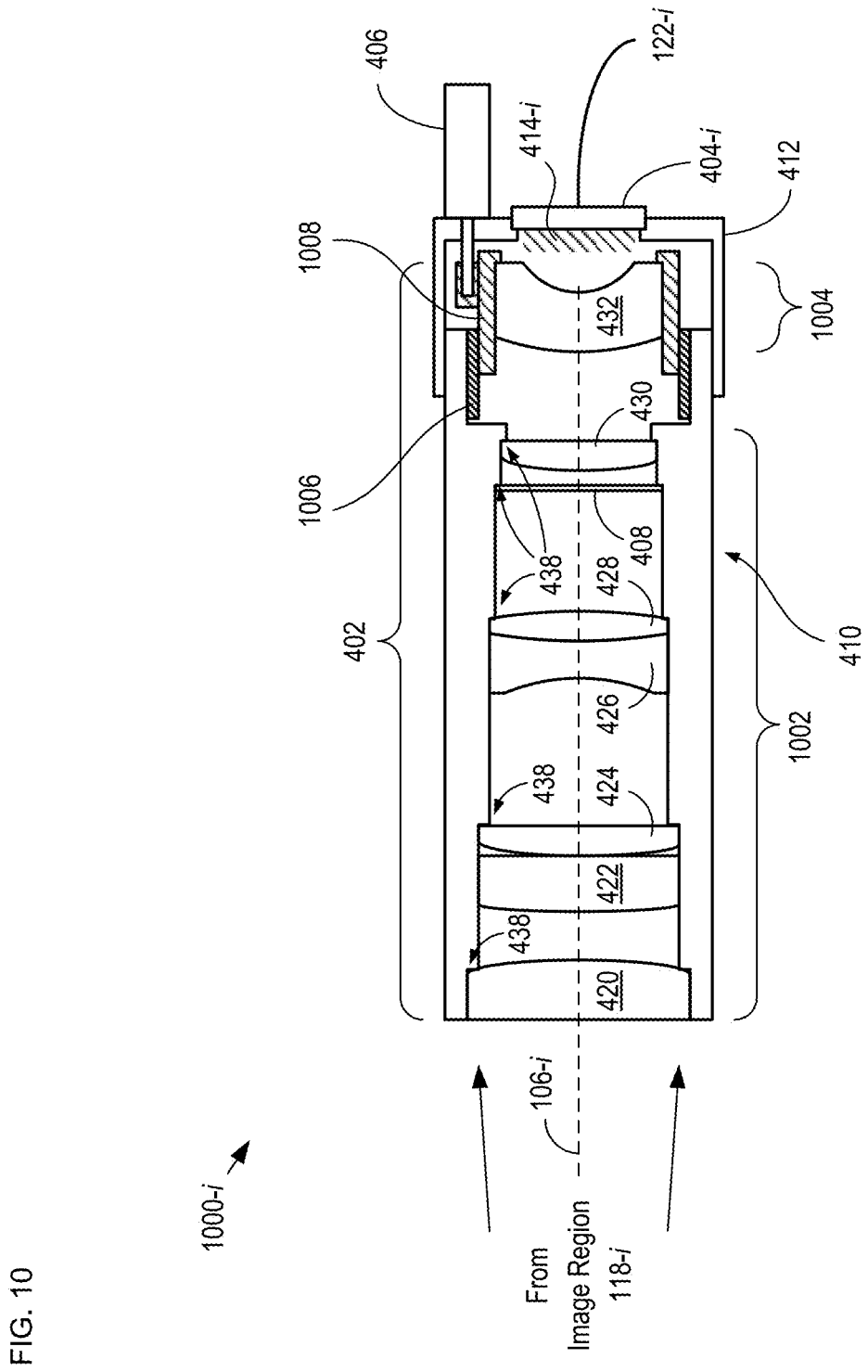
FIG. 10 depicts a schematic drawing of a cross-section of a microcamera in accordance with a first alternative embodiment of the present invention.

FIG. 10 depicts a schematic drawing of a cross-section of a microcamera in accordance with a first alternative embodiment of the present invention. Microcamera 1000-*i* comprises camera optics 402, focal-plane array 404-*i*, linear actuator 406, filter 408, lens body 410, and end cap 412. Microcamera 1000-*i* is analogous to microcamera 104-*i* described above and with respect to FIG. 4; however, microcamera 1000-*i* includes only one lens that is movable relative to focal-plane array 404-*i*.

Table 3 below summarizes an exemplary prescription for microcamera 104-*i*, wherein only lens 432 is movable. The surface designations are based on the ray trace of system 100 provided in FIGS. 5A and 5B.

TABLE 3

Design parameters for a microcamera having one movable lens.

| Surface | Radius (mm) | Thickness (mm) | Glass (Schott catalog) | Semi-Diameter (mm) | Comments |
|---|---|---|---|---|---|
| 6 | Infinity | 52 | | 11.15252 | |
| 7 | 88.7072 | 2.5 | N-SF2 (n = 1.647690, V = 33.82.0209) | 10.4 | |
| 8 | −88.7072 | 2 | | 10.4 | |
| 9 | 31.37584 | 4 | N-SF2 | 9.4 | |
| 10 | 13.31014 | 3 | N-LAK12 (n = 1.677900, V = 55.199566) | 9.4 | |
| 11 | Infinity | 16.59874 | | 8.958674 | |
| 12 | Infinity | 0.6 | | 4.946445 | Stop |

TABLE 3-continued

Design parameters for a microcamera having one movable lens.

| Surface | Radius (mm) | Thickness (mm) | Glass (Schott catalog) | Semi-Diameter (mm) | Comments |
|---|---|---|---|---|---|
| 13 | −9.945285 | 3 | N-SF2 | 5.989823 | |
| 14 | 10.5157 | 3 | N-BAK1 (n = 1.572500, V = 57.549310) | 7.111982 | |
| 15 | −10.5157 | 17.56672 | | 7.80175 | |
| 16 | Infinity | 1 | N-BK7 | 10.70364 | IR Cutoff |
| 17 | Infinity | 2.5 | | 10.80858 | |
| 18 | 17.15128 | 2.5 | N-SK14 (n = 1.603110, V = 60.596819) | 11.33628 | Movable Lens 418 |
| 19 | Infinity | 2.7 | | 11.09715 | |
| 20 | 9.311836 | 7 | N-SF6 (n = 1.805180, V = 25.359729) | 10.20788 | |
| 21 | Infinity | 2.4 | | 6.351469 | |
| 22 | Infinity | 0.4 | N-BK7 | 5.819427 | Cover Glass |
| 23 | Infinity | 0.125 | | 5.761382 | |

In microcamera 1000-*i*, camera optics 402 includes fixed-lens system 1002 and movable-lens system 1004, which collectively focus image region 118-*i* as optical sub-image 414-*i* onto focal-plane array 404-*i*.

Fixed-lens system 1002 is analogous to fixed-lens system 416; however, fixed-lens system 1002 also includes lens 430 and filter 408, which are fixed in lens tube 402 by shoulders 438.

Movable-lens system 1004 includes only lens 432.

Bearing sleeve 1006 and carriage 1008 are analogous to bearing sleeve 434 and carriage 436 but are sized appropriately for the configuration of camera optics 402. Lens 432 is mounted in carriage 1008.

In similar fashion to microcamera 104-*i*, microcamera 1000-*i* is image-side telecentric.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An optical system for imaging a scene, the optical system comprising:
 a first optical element, the first optical element being operative for forming a three-dimensional image field of the scene; and
 a plurality of microcameras that is arranged such that each microcamera has a unique optical axis that extends radially from the first optical element through the image field, each of the plurality of microcameras comprising (1) camera optics that includes at least one lens element and (2) a focal-plane array, and each of the plurality of camera optics being operative for relaying a different image region of the image field as an optical sub-image that is focused onto its respective focal-plane array, wherein at least one of the plurality of microcameras has controllable focus, and wherein at least one of the microcameras of the plurality thereof is operative for reducing the magnitude of an aberration in its relayed image region.

2. The optical system of claim 1, wherein the first optical element is a monocentric lens, and wherein the axis of each of the plurality of microcameras extends through the center of the monocentric lens.

3. The optical system of claim 1, wherein the first optical element is a non-monocentric optical element having an exit aperture, and wherein the axis of each of the plurality of microcameras extends through the center point of the exit aperture.

4. The optical system of claim 1, wherein at least one of the plurality of microcameras is operative for controlling the position, along its respective optical axis, of the image region of the image field that is relayed onto its focal-plane array, wherein the position is based on the range at which the microcamera is focused.

5. The optical system of claim 1, wherein at least one of the plurality of microcameras is operative for controlling at least one of its gain, image magnification, exposure, depth-of-field, and dynamic range.

6. The optical system of claim 1, wherein the camera optics of at least one of the plurality of microcameras comprises:
 a second optical element; and
 a first actuator that is operative for controlling the separation between the second optical element and the focal-plane array.

7. The optical system of claim 6, wherein the at least one of the plurality of microcameras is characterized by a lateral extent, and wherein the first actuator is within the lateral extent.

8. The optical system of claim 6, wherein the camera optics of the at least one of the plurality of microcameras further comprises:
 a third optical element; and
 a second actuator that is operative for controlling the separation between the third optical element and the focal-plane array.

9. The optical system of claim 1, wherein at least one of the plurality of microcameras is image-side telecentric.

10. The optical system of claim 1, wherein at least one of the plurality of microcameras comprises a polarization filter.

11. The optical system of claim 1, wherein at least one of the plurality of microcameras comprises a wavelength filter.

12. An optical system for imaging a scene, the optical system comprising:
 a first optical element that is operative for forming an image field of the scene; and
 a plurality of microcameras that is arranged such that each microcamera has a unique optical axis that extends radially from the first optical element through the image field, each microcamera comprising (1) camera optics that includes at least one lens element and (2) a focal-plane array, and the camera optics of each of the plurality of microcameras being operative for relaying a different image region of the image field as an optical sub-image that is focused on its respective focal-plane array;

wherein the image field is characterized by a first depth along the optical axis of a first microcamera of the plurality thereof, and wherein the camera optics of the first microcamera are operative for controlling the range within the first depth at which the microcamera is focused.

13. The optical system of claim 12 wherein the first microcamera is operative for at least partially correcting a first aberration in its respective relayed image region.

14. The optical system of claim 12, wherein at least one of the plurality of microcameras is operative for controlling at least one of its gain, image magnification, exposure, depth-of-field, and dynamic range.

15. The optical system of claim 12, wherein at least one of the microcameras is operative for controlling the separation between at least a portion of its camera optics and its focal-plane array.

16. The optical system of claim 15, wherein the camera optics of at least one of the plurality of microcameras comprises a second optical element and a third optical element, and wherein the at least one of the microcameras is operative for controlling the separation between the second optical element, the third optical element, and its focal-plane array.

17. The optical system of claim 12, wherein at least one of the microcameras comprises a polarization filter.

18. The optical system of claim 12, wherein at least one of the microcameras comprises a wavelength filter.

19. A method for forming an image of a scene, the method comprising:

imaging the scene through a first optical element to form a three-dimensional image field;

providing a plurality of microcameras, each microcamera comprising (1) camera optics that includes at least one lens element and (2) a focal-plane array, wherein the plurality of microcameras is arranged such that each of the plurality of microcameras has a unique optical axis that extends radially from the first optical element through the image field, and wherein at least one microcamera of the plurality thereof has controllable focus;

relaying a plurality of image regions of the image field, wherein each image region is relayed by the camera optics of a different microcamera of the plurality thereof as an optical sub-image that is focused on its respective focal-plane array; and converting each optical sub-image of the plurality thereof into a digital sub-image.

20. The method of claim 19, wherein each of the plurality of image regions is characterized by a position along its respective optical axis, a thickness along its respective optical axis, and a lateral extent about its respective optical axis, and wherein a first image region of the plurality of image regions is focused by a first microcamera of the plurality of microcameras onto its respective focal-plane array, and further wherein the method further comprises controlling the focus of the first microcamera to control the position of the image region along its respective optical axis.

21. The method of claim 19, further comprising controlling at least one of gain, image magnification, exposure, depth-of-field, and dynamic range of at least one of the plurality of microcameras.

22. The method of claim 19, further comprising combining the plurality of digital sub-images to form a composite digital image of the scene.

23. The method of claim 22, wherein the plurality of digital sub-images is combined such that the composite digital image is a substantially three-dimensional image.

24. The method of claim 22, wherein the plurality of sub-images is combined such that the composite digital image includes a substantially parallax image.

25. The method of claim 22, wherein the plurality of sub-images is combined such that the composite digital image is characterized by at least one of enhanced depth-of-field and enhanced dynamic range.

26. The method of claim 19, wherein at least one of the plurality of microcameras is provided such that its camera optics correct an aberration in its respective relayed image region.

27. The method of claim 26, wherein the at least one of the plurality of microcameras is provided such that its camera optics further comprises a third optical element, and wherein the method further comprises controlling the separations between the second optical element, the third optical element, and its respective focal-plane array.

28. The method of claim 19, wherein at least one of the plurality of microcameras is provided such that it further comprises a polarization filter, and wherein the method further comprises controlling the polarization of the sub-image.

29. The method of claim 19, wherein at least one of the plurality of microcameras is provided such that it further comprises a wavelength filter.

30. The method of claim 19, wherein at least one of the plurality of microcameras is provided such that it is image-side telecentric.

* * * * *